United States Patent [19]

Styes

[11] 3,990,042
[45] Nov. 2, 1976

[54] INERTIA OPERATED SKID INDICATOR

[76] Inventor: Fred J. Styes, Mackinac County Medical Care Facility, St. Ignace, Mich. 49781

[22] Filed: Oct. 29, 1975

[21] Appl. No.: 626,666

[52] U.S. Cl. ............................... 340/62; 340/262; 200/61.45 R
[51] Int. Cl.² ..................................... B60T 8/02
[58] Field of Search .................... 340/52 R, 62, 262; 200/61.45 R

[56] References Cited
UNITED STATES PATENTS
3,798,593   3/1974   Sartor .............................. 340/62 X

*Primary Examiner*—Alvin H. Waring
*Attorney, Agent, or Firm*—Charles W. Chandler

[57] ABSTRACT

A pendulum operated device for warning the operator of a vehicle that the wheels of the vehicle are rotating faster than the vehicle is being accelerated or decelerated.

6 Claims, 5 Drawing Figures

U.S. Patent  Nov. 2, 1976  3,990,042
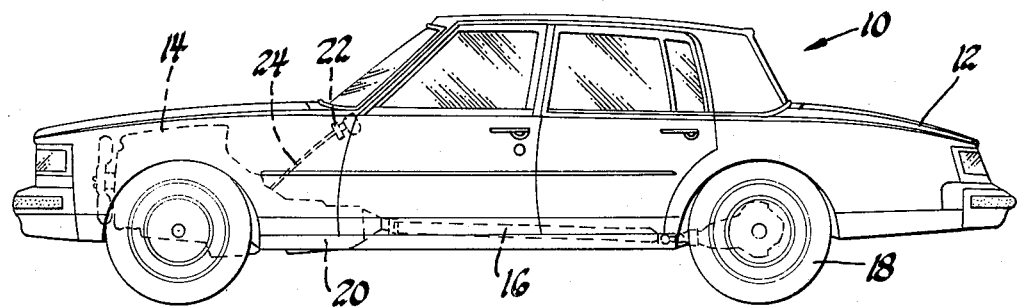
Fig. 1
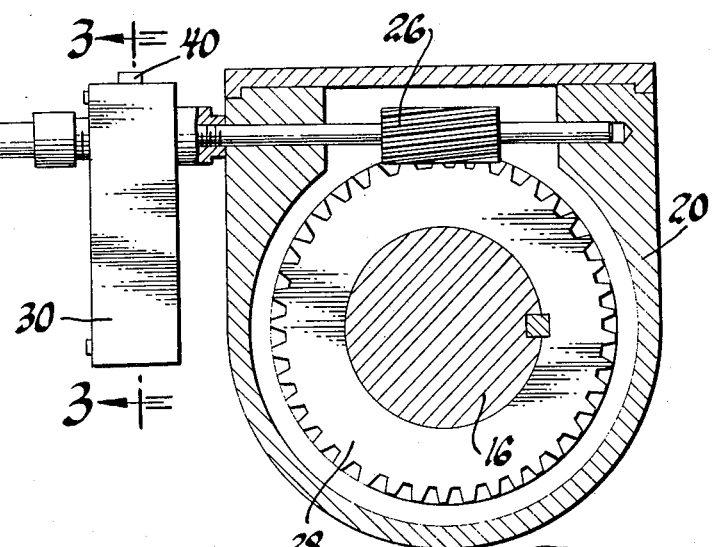
Fig. 2
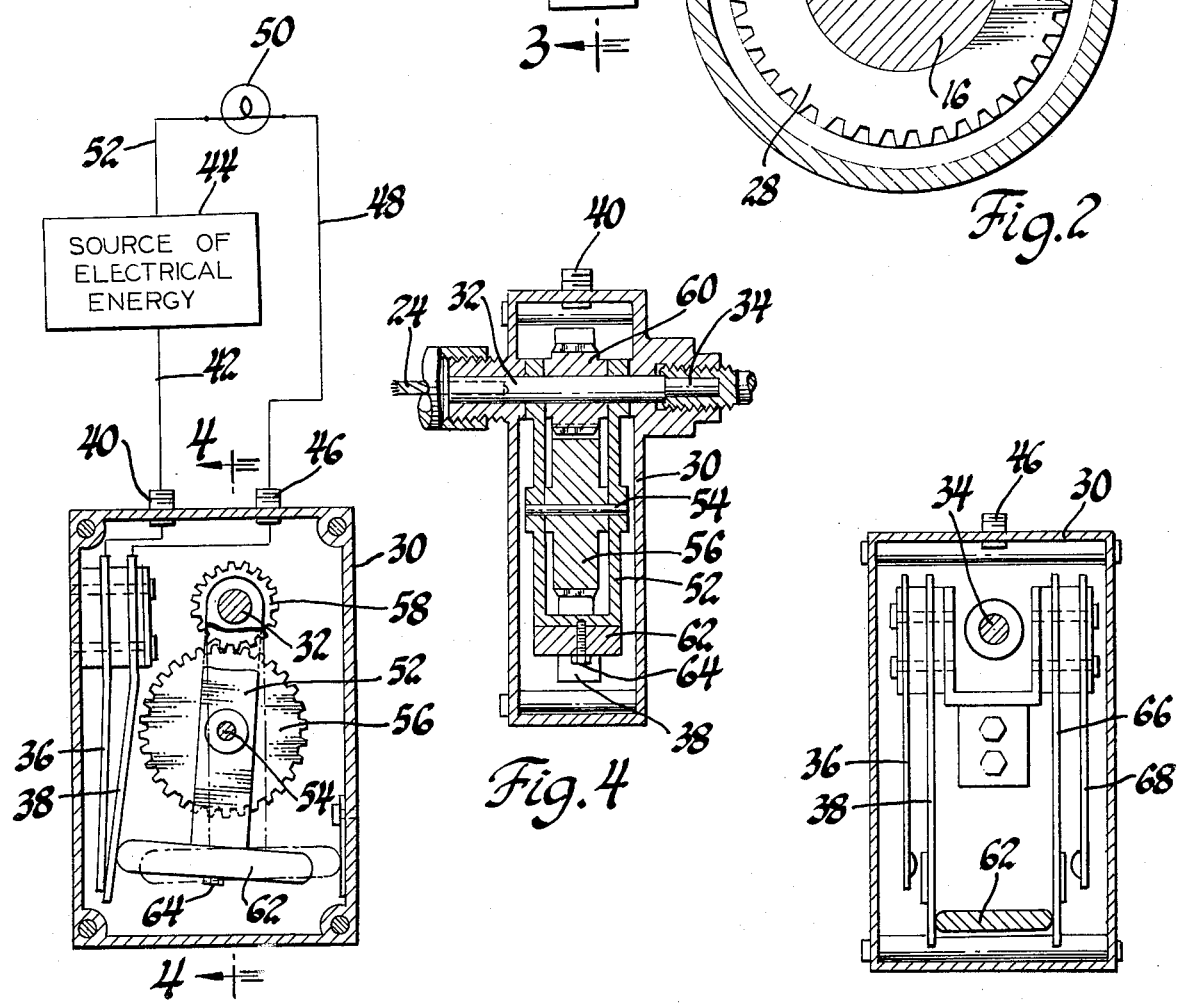
Fig. 3
Fig. 4
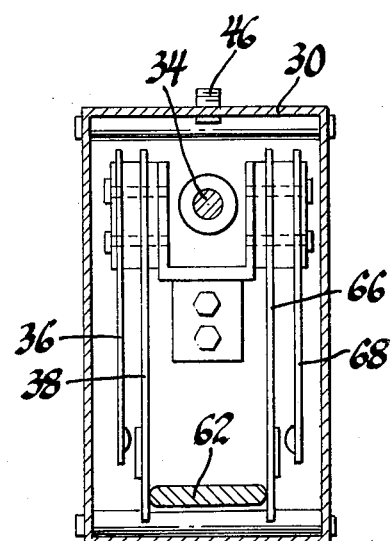
Fig. 5

INERTIA OPERATED SKID INDICATOR

BACKGROUND OF THE INVENTION

This invention relates to warning devices for motor vehicles and more particularly to a pendulum-actuated device for indicating to the operator of a vehicle that his wheels are spinning due to ice or other foreign matter on the pavement.

SUMMARY OF THE INVENTION

One of the broad purposes of the present invention is to provide a pendulum-actuated indicator for a motor vehicle for warning the operator of the vehicle that his wheels are beginning to spin as in a situation when he is attempting to accelerate the vehicle to pass another vehicle, but instead should reduce speed before he loses control of his own vehicle.

The preferred embodiment of the invention can be installed in a few minutes between the vehicle transmission and the speedometer cable of a conventional vehicle by removing the speedometer cable from the transmission and then mounting a switch housing between the transmission and the cable. In a second form of the device, the indicator is actuated when the vehicle is either being accelerated or decelerated.

These and other objects of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views and in which:

FIG. 1 illustrates a vehicle having a skid indicator in accordance with the present invention;

FIG. 2 is an enlarged view of the transmission illustrating the preferred switch housing mounted between the speedometer cable and the transmission housing of the vehicle of FIG. 1;

FIG. 3 is a view taken along lines 3—3 of FIG. 2 showing a source of the electrical energy and an electrically actuated indicator system;

FIG. 4 is a view taken at right angles to FIG. 3;

FIG. 5 is a view of another embodiment of the invention.

DESCRIPTION OF THE PREFERRED EMBODIMENT

FIG. 1 illustrates a vehicle generally indicated at 10 having a body 12 supporting a conventional engine 14 which is driveably connected by drive shaft 16 to a rear wheel 18. A transmission 20 connects engine 14 to drive shaft 16. A speedometer 22 is connected by cable 24 to a pinion 26 carried by transmission 20. The pinion engages an appropriate gear 28 carried by drive shaft 16.

Referring to FIGS. 3 and 4, a switch housing 30 is mounted adjacent transmission 20, and has a bore 32 rotatably supporting a speedometer extension 34 adapted to connect cable 24 to pinion 26.

A pair of elongated flexible switch arms 36 and 38 are mounted adjacent one side of housing 30. The lower end of arm 38 is normally spaced with respect to the lower end of arm 36. The upper end of arm 36 is connected to a terminal 40 which is in turn connected by connection 42 to a source of electrical energy 44, preferrably comprising the vehicle battery. The upper end of arm 38 is connected to terminal 46 which is connected by connection 48 to indicator 50. A connection 52 between source of electrical energy 44 and indicator 50 complete the circuit.

A U-shaped bracket 52 is pivotally supported on extension 34. A pin 54 has its opposite ends supported in bracket 52. A flywheel 56 is rotatably mounted on pin 54. The outer periphery of flywheel 56 has a regularly spaced series of teeth 58 engaged with a pinion 60 carried on extension 34 so as to rotate with the extension. Since extension 32 rotates with the speedometer cable, as well as with wheel 18, pinion 60 and flywheel 56 rotate with extension 34. Preferably flywheel 56 rotates with and in the same direction of rotation as wheel 18. A pendulum 62 is connected by fastener 64 to the bottom of bracket 62.

Pendulum 62 is chosen of a weight selected so that it normally remains in a stationery position as the vehicle is being accelerated or decelerated. Pendulum 62 is elongated with one end closely adjacent switch member 38 which biases the pendulum against motion toward switch member 36. However, should wheel member 18 begin to spin so that it is moving at an abnormal rate of rotation while the vehicle body 12 is not advancing in proportional rate of speed, flywheel 56, because of its mass, moves in a counterclockwise direction with respect to pinion 60 and thereby causes pendulum 62 to overcome the bias of switch member 38 until it engages switch member 36 to thereby close the electrical circuit and energize indicator 50.

FIG. 5 shows another embodiment of the invention which is similar to the embodiment of FIG. 2 except that a second pair of resilient switch members 66 and 68 have been mounted on the opposite side of the pendulum of switch members 36 and 38.

Switch member 66 is adjacent the end of pendulum 62 in the same manner as switch member 38 to bias the pendulum against motion. Switch member 68 is connected to terminal 46 and switch member 66 is connected to terminal 40 as wheel 18 starts as the vehicle is being decelerated, the flywheel causes pendulum 62 to moves switch member 66 toward switch member 68 until the two are engaged to complete the indicator circuit.

The weight of flywheel 56 is so balanced that under normal conditions the pendulum remains relatively stationery with respect to the vehicle body until wheel 18 begins spinning. Indicator 50 can comprise a warning light, a buzzer or any other appropriate form of alarm disposed adjacent the vehicle operator.

Having described my invention, I claim:

1. In a vehicle the combination comprising:
   a body having a rotatable wheel member, and power means drivingly connected to the wheel member;
   indicator means;
   a flywheel connected to the wheel member so as to be rotatable therewith; and
   a pendulum mounted in the vehicle so as to be movable with respect to the vehicle body, and so connected to the flywheel as to move from a first position toward a second position to actuate the indicator means in response to the wheel member being rotated with respect to the vehicle.

2. A combination as defined in claim 1, in which the pendulum member is movable toward a first direction for actuating the indicator means, and including bias means urging the pendulum member in the opposite direction whereby the pendulum is operative to actuate the indicator only in response to a predetermined motion of the wheel member with respect to the vehicle body.

3. A combination as defined in claim 1, including a speedometer cable connected to the wheel member to rotate therewith and the flywheel is drivingly rotatably connected to the speedometer cable.

4. A combination as defined in claim 1, including electrical switch means disposed adjacent the pendulum and operatively connected to the indicator means to actuate same in response to a predetermined motion of the pendulum.

5. A combination as defined in claim 1, in which the pendulum member is movable in a first direction as the vehicle is being accelerated, or in a second direction as the vehicle is being decelerated, and including a first switch means disposed to energize the indicator means as the pendulum member is being moved in the first direction, and second switch means disposed to energize the indicator means as the pendulum member is being moved in the opposite direction.

6. A combination as defined in claim 1, in which the flywheel is rotatable about its axis in the same direction as the wheel member.

* * * * *